Feb. 11, 1930.  W. N. GOODWIN, JR  1,746,935
APPARATUS FOR THE MEASUREMENT OF VERY WEAK ALTERNATING CURRENTS
Filed Oct. 27, 1925
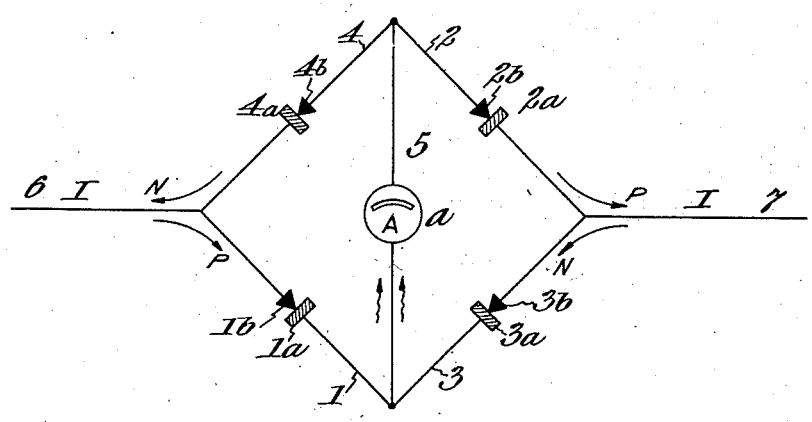
INVENTOR:
William Nelson Goodwin, Jr.,
BY
Byrnes Townsend & Brickenstein
ATTORNEYS.

Patented Feb. 11, 1930

1,746,935

UNITED STATES PATENT OFFICE

WILLIAM NELSON GOODWIN, JR., OF NEWARK, NEW JERSEY, ASSIGNOR TO WESTON ELECTRICAL INSTRUMENT CORPORATION, OF NEWARK, NEW JERSEY, A CORPORATION OF NEW JERSEY

APPARATUS FOR THE MEASUREMENT OF VERY WEAK ALTERNATING CURRENTS

Application filed October 27, 1925. Serial No. 65,201.

This invention relates to an apparatus for the measurement of very weak alternating currents.

The principal object of the invention is an apparatus permitting the measurement of relatively minute alternating currents.

Another object is a portable apparatus of simple construction for the measurement of relatively minute currents.

Heretofore weak alternating currents have been measured by means of thermo-electric couples in connection with sensitive D. C. galvanometers, but with these, the lowest current which can be measured in a portable instrument is about 600 micro-amperes.

The invention, briefly expressed, comprises four crystals, preferably of the fixed type, as used for radio reception, interconnected in the form of a Wheatstone bridge so as to pass current only in one direction through the galvanometer branch of the bridge.

The application of an asymmetric conductor and of a crystal more in particular, for the measurement of alternating current is disclosed in the U. S. Patent 879,061.

However, the method involved does not afford a true measure of the alternating current in the line. Aside from the fact that only one-half of the wave is the basis for the measurement, the cutting out of one-half of the wave throughout the entire circuit totally changes the outside circuit conditions.

The invention, the specific principle of operation and the advantages thereof will be apparent from the specification in connection with the accompanying drawing, and the points of novelty will be particularly pointed out in the claim.

In the drawing, which is a more or less diagrammatic representation of a circuit embodying the invention, 1, 2, 3 and 4 represent the four arms of a Wheatstone bridge and 5 represents the galvanometer branch including the galvanometer $a$. Connections 6 and 7 lead to the service junctions, i. e., the junction of arms 1 and 4 and 2 and 3 respectively. The relative position of the crystals $1^a$, $2^a$, $3^a$, $4^a$ and the contact elements $1^b$, $2^b$, $3^b$ and $4^b$ is such that the current flowing to the bridge from either connection flows through the instrument $5^a$ in the same direction. As indicated for the sake of example, the current flowing from the connection 6 can pass through the crystal elements of the arms 1 and 2 while the current coming from the connection 7 can flow through the arms 3 and 4. In both cases, the current flows from the junction of arms 1 and 3 through the instrument $5^a$ to the junction of arms 2 and 4.

Thus both halves of the wave pass through the instrument in the same direction and are made useful for measuring purposes.

The important point, however, is this: The single crystal has a high resistance for one direction of current flow and a low resistance for currents in the opposite direction. The present arrangement offers the same comparatively low resistance for both directions of the current in contra-distinction to a single crystal circuit where alternately a high and a low resistance is presented to the current flow. As a result, the present arrangement allows the undistorted alternating current to flow in the outside circuit and rectification takes place only in that cross-arm of the bridge which includes the measuring apparatus only.

The difference between thermo-couples in bridge form from crystals according to the present invention is that the latter does not follow the usual square law as does the former, with the result that much smaller currents can readily be measured by an ordinary commercial form of instrument. As an example, the lowest current which will give a full scale deflection on an ordinary pivoted coil meter, using thermo-couples, is about 1-2 milliamperes or .001-.002 amperes, whereas with the crystal arrangement and an equally rugged measuring instrument full scale currents as low as 50 micro-amperes (.00005 ampere) can be obtained.

I claim:

A milliammeter responsive to alternating currents of the order of less than one milliampere comprising a direct current measuring instrument and four crystals interconnected in the form of a Wheatstone bridge, the crystals being so disposed in the four arms of the bridge that the two halves of the wave pass through the instrument in the same direction.

In testimony whereof, I affix my signature.

WM. NELSON GOODWIN, Jr.